Figure 1:
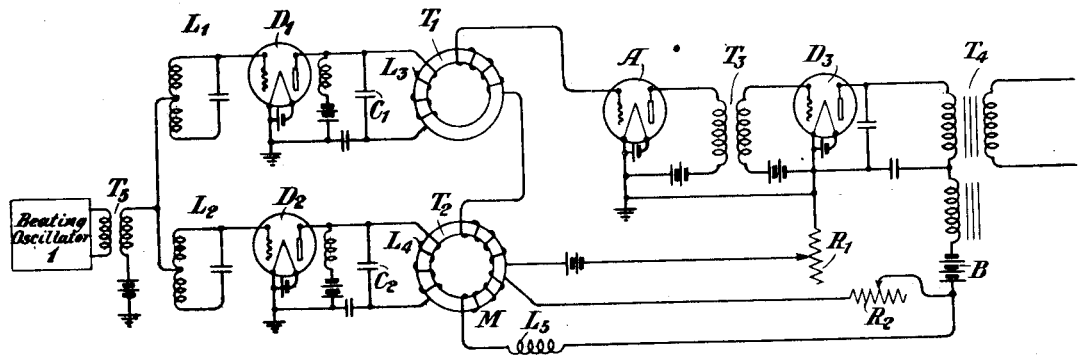

July 9, 1929.  DE LOSS K. MARTIN  1,719,845
REDUCTION OF FADING OF RADIO SIGNALS
Original Filed Feb. 24, 1927  2 Sheets-Sheet 1

INVENTOR.
D. K. Martin
BY
ATTORNEY

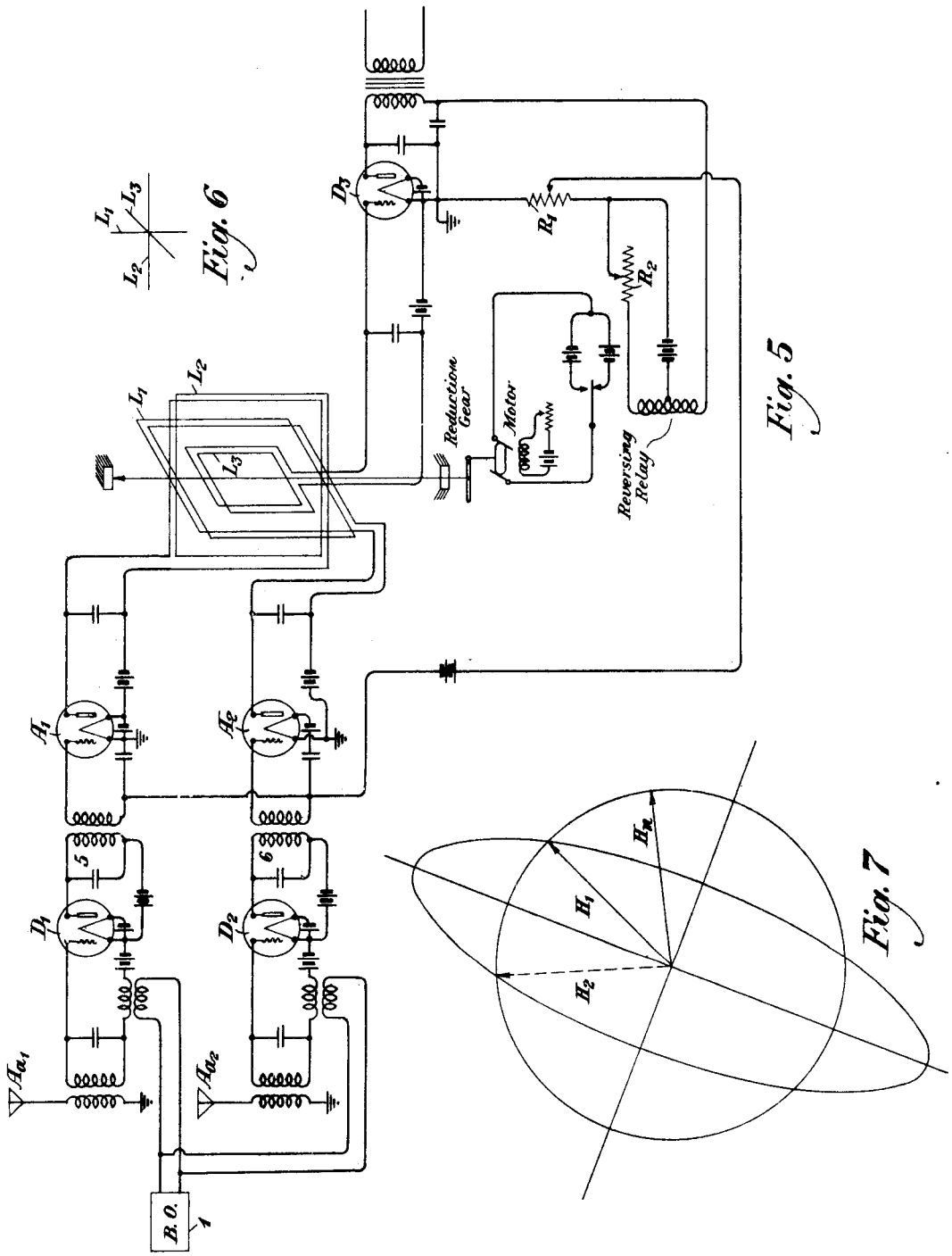

Patented July 9, 1929.

1,719,845

UNITED STATES PATENT OFFICE.

DE LOSS K. MARTIN, OF WEST ORANGE, NEW JERSEY, ASSIGNOR TO AMERICAN TELEPHONE AND TELEGRAPH COMPANY, A CORPORATION OF NEW YORK.

REDUCTION OF FADING OF RADIOSIGNALS.

Application filed February 24, 1927, Serial No. 170,625. Renewed November 16, 1928.

This invention relates to improvements in methods of and means for reducing the fading of radio signals.

The term fading, as applied to radio signals, is used with the commonly accepted meaning, referring to the relatively slow changes in the amplitude of the signal with time. The phenomena of fading is usually manifested at night, but is not limited to this general period of time, as signal fading has also been observed during the sunlit period of the day. The fading of the radio signal is caused by the interference of two or more signals which are varying in amplitude and phase; the received signal is, of course, the resultant of the interfering signals. Fading is also variable with respect to space; this includes the physical position of the receiving antenna and the space absorption characteristic of the antenna. The received signal may be conceived as being the resultant of several interfering wave fronts which are traversing a medium which is changeable in its characteristics. One component wave may be assumed to be intimately associated with the conductivity of the earth's surface over which it is passing. The transmission of this wave component, termed the direct wave, would not be modified by the presence or absence of sunlight as there is no reason to believe that light affects the conductivity of the ground. However, the other component waves traversing the upper atmosphere are materially modified by the absence of sunlight. Hence, in theory, it would be desirable to select with suitable means, the component wave from the resultant which will give uniform amplitude.

In practice, however, it is very difficult to make this selection, as it is necessary to balance out the variable components by combining out of phase these variable signals from two or more receiving points, and due to the very nature of these variable components it probably would be impossible to get a perfect balance. Or the direct wave signals may be balanced out, leaving the combination of variable components whose resultant also would be expected to be variable to a degree. Hence, a compromise of these two methods would seem to afford a desirable method of obtaining a solution. Accordingly, it is the general purpose of the arrangements of this invention to combine the signals from two or more receiving points and to provide means to maintain the resultant of this combination substantially uniform in amplitude. The arrangements of this invention accomplish the desired result by two distinct arrangements; first, by providing automatic gain regulation of the amplifying devices in the receiving system; secondly, by providing means to automatically change the phase of the received signals in such a way as will tend to maintain constant the amplitude of the resultant of the combined signals. Further objects and features of the invention will appear more fully from the detailed description thereof hereinafter given.

Figure 3:
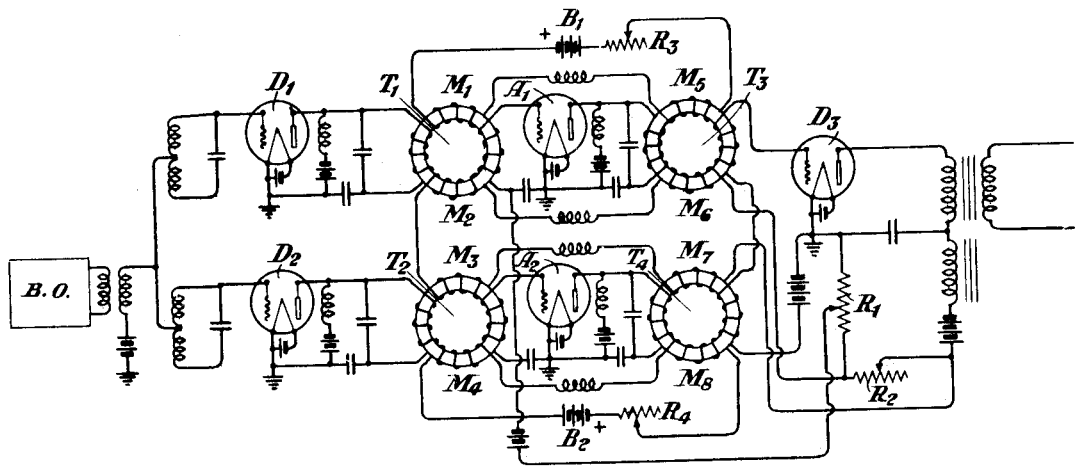
Figure 2:
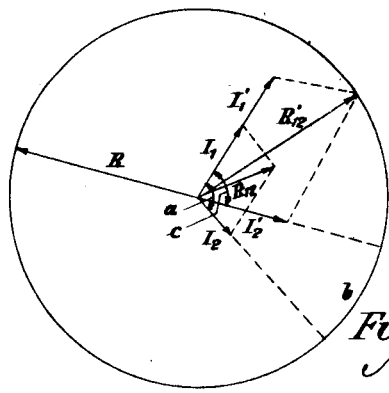
Figure 4:
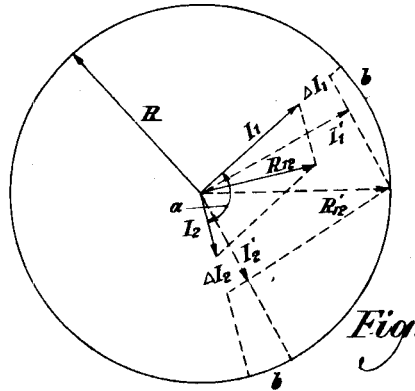

The invention may be more fully understood from the following description, together with the accompanying drawing in the Figures 1, 2, 3, 4, 5, 6, and 7, of which the invention is illustrated. Fig. 1 is a circuit diagram embodying one form of the invention. Figs. 3 and 5 are circuit diagrams illustrating modifications of the arrangements of Fig. 1. Figs. 2, 4 and 7 are vector diagrams illustrating the principles of operation of the arrangements shown in Figs. 1, 3 and 5, respectively. Fig. 6 is a plan diagram of details of arrangements of Fig. 5. Similar reference characters have been utilized to denote like parts in all of the figures of the drawing.

In the receiving system of Fig. 1 are shown two loop antennæ $L_1$ and $L_2$, tuned to receive the same radio signal. These loops are connected to the grid circuits of the detectors $D_1$ and $D_2$, and are also connected to battery and ground by a common lead which includes the winding of a transformer $T_5$. By means of the transformer $T_5$, a local signal from the beating oscillator 1 is impressed on the grids of the detector tubes along with the signal that is being received. The frequency of the beating oscillator is different from the frequency of the received signal, and either the sum or the difference of these frequencies may be selected at the outputs of the detectors by means of the tuned transformer circuits with iron or magnetic cores $T_1$ and $T_2$. The secondary windings of these transformers are connected in series, so that the combined signal is applied to the grid circuit of the amplifier tube A. The signal from the output of the intermediate frequency amplifier tube A is applied to the grid circuit of the detector tube $D_3$. It is at this point in the circuit that the audio signal is detected. The output of the detector tube $D_3$ may be connected through a transformer $T_4$ to a receiver circuit.

The automatic gain regulation of the receiving system is accomplished by controlling the gain of the intermediate frequency amplifier A by varying the negative potential applied to the grid of the tube A. This variable negative potential is obtained from the voltage drop along the resistance $R_1$ due to variations in the plate current of the detector tube $D_3$. The variation in the plate current of the detector is primarily due to the fading of the carrier signal impressed on the grid of the detector tube from the combined antennæ circuits. As the carrier signal fades to a maximum, or increases, the plate current of the detector tube $D_3$ will increase which in turn results in a greater voltage drop along the resistance $R_1$ in the plate circuit of the tube; this voltage drop along the resistance $R_1$ is applied to the grid of the intermediate frequency amplifier A so as to make the grid more negative with increasing plate current and less negative, from a mean value for decreasing plate current. An increase in the negative grid potential applied to the amplifier tube A will reduce the gain obtained from that tube, and the converse of this relation is also effective. This automatic gain control of the amplifier will tend to materially improve the constancy of the amplitude of the combined signals.

As the phase of the signals at the intermediate frequency from the outputs of detectors $D_1$ and $D_2$ may have any values and are variable, it is desirable in accordance with another feature of this invention to provide arrangements to modify the phase in such a direction as will tend to maintain a mean value of signal level.

The phase modification feature of the invention may be more readily understood by reference to the vector diagram of Fig. 2. Let it be assumed that $I_1$ and $I_2$ represent the signals from the detectors, with the phase angle $a$ between them. Their resultant is $R_{12}$, which is smaller in magnitude than the mean desired signal R. By reducing the phase angle $a$, the resultant $R_{12}$ can be made to approach R. This can be accomplished by advancing the phase of $I_2$ through the angle $b$ so that the phase angle is now $c$. At the same time, the gain is automatically adjusted in the intermediate frequency amplifier A, as has been pointed out, so that the magnitude of $I_1$ and $I_2$ becomes $I_1'$ and $I_2'$, respectively. The resultant is shown as $R_{12}'$, which is equal to R, the amplitude of the mean desired signal.

This change in the phase of the signal $I_2$ is brought about by detuning the selective transformer $T_2$. The tuned circuit is detuned by changing the permeability of the core of the transformer $T_2$ by means of a magnetizing field set up in the winding M in the plate circuit of the detector $D_3$. A radio-frequency choke coil $L_5$ is placed in this circuit to make the impedance of the circuit very high at the intermediate frequency. The current in the phase control coil M is adjusted to a desired working value by means of the variable resistance $R_2$.

It is pointed out that, with the above described arrangements of the invention, the automatic phase regulation and automatic gain control both function simultaneously and tend to maintain the signal at a mean value.

The control of the inductance of a coil with an iron magnetic circuit is described in detail on page 107, Proceedings of the Institute of Radio Engineers, vol. 4, 1916, and reference is had thereto for a further explanation thereof.

It is pointed out that when the core material of the selective transformers is iron, it will be desirable to select the difference frequencies resulting from beating the received and beating oscillator signals in the first detectors. This is due to the fact that the effective permeability of the iron is greater at the lower frequencies, hence a more effective control of the permeability can be obtained by means of the magnetizing circuit.

Curves showing the change in phase of signals transmitted through a filter and a tuned circuit are given on pages 103–105 of Volume II, Number 2, Bell System Technical Journal. The corresponding relations between the transmitted frequency and phase variations with circuit changes are similar in their characteristic relations to that shown by these curves and reference may be had thereto for a further explanation thereof.

It is pointed out that the circuit shown in Fig. 1 has limitations in the magnitude of the maximum phase change obtained from detuning one simple tuned circuit. Accordingly, other types of phase shifting circuits may be used to obtain the desired phase changes in accordance with the arrangements of this invention, such, for example, as several sections of a ladder type of wave filter. Also, several tuned circuits may be used in tandem, as shown in the modification of the invention shown in Fig. 3.

In the circuit of Fig. 3, four transformers $T_1$, $T_2$, $T_3$ and $T_4$ are each provided with two magnetizing windings $M_1$, $M_2$; $M_3$, $M_4$; $M_5$, $M_6$; and $M_7$ and $M_8$. These are provided for the purpose of controlling the permeability of the core material of the transformers.

The phase shifting circuits are arranged to shift the phase of the signals from the detectors $D_1$ and $D_2$ oppositely. To accomplish this, the permeabilities of the cores are adjusted to particular working values by means of the windings $M_1$, $M_5$, $M_4$ and $M_8$, and current from batteries $B_1$ and $B_2$. The phase controlling current from the output circuit of detector $D_3$ traverses the coils $M_2$, $M_6$, $M_3$ and $M_7$. The poling of the current in coils $M_2$ and $M_6$, and $M_3$ and $M_7$ is such as to cause the phases of the signal currents to shift oppositely.

In the arrangements of Fig. 3, the signals are combined at the outputs of the intermediate frequency amplifiers $A_1$ and $A_2$ by connecting the secondary windings of the transformers $T_3$ and $T_4$ in series. The variations in the resultant signal are used to correct both the signal level and phase of the components.

The operation of the arrangements of Fig. 3 may be more fully understood from the vector diagram of Fig. 4. Let it be assumed that the component signals are $I_1$ and $I_2$, their resultant $R_{12}$, and that the mean desired signal is R as shown in Fig. 4. Since $R_{12}$ is less than R, the circuit functions to increase $R_{12}$ until it equals R in magnitude. The gain in the intermediate frequency circuits will be automatically adjusted to be greater than the normal gain in the amplifier, as the voltage drop in the resistance $R_1$ is less than that obtained from the desired mean signal. The amplitude of the signals will be increased by the amounts $\Delta I_1$, and $\Delta I_2$, and the phase of the components will be shifted in opposite directions by the angle $b$. The new resultant $R_{12}'$ of the signals $I_1'$ and $I_2'$, as shown, is now equal to R.

If the phase angle $a$ between the components is greater than $\pi$, the phase shifts and amplitude changes of the components by this circuit will be in opposition, so that the desired control of the resultant signal is not obtained unless the direction of the phase shift of one component is reversed; then the effects will be accumulative.

Another similar method of attacking the problem of reducing the effects of signal fading is illustrated in Figs. 5, 6, and 7. The arrangements are substantially similar to those heretofore described except that the phase shifting is accomplished by varying the magnetic field of certain coils in a well known manner, rather than by changing the permeability of the core of a transformer as heretofore explained.

In Fig. 5 two spaced antennæ $Aa_1$ and $Aa_2$ are used to obtain signals from the same source for the purpose of combining the signal in a manner which will reduce the effects of fading. The received signals are beat in the detectors $D_1$ and $D_2$ with a signal from the beating oscillator 1 as in the systems previously described. The intermediate frequency signal is selected by means of the tuned circuits 5 and 6 and amplified by means of the amplifiers $A_1$ and $A_2$. The amplifiers are terminated by tuned circuits which include the coils $L_1$ and $L_2$. The axes of these coils are fixed at right angles as illustrated by the plan view of the coils shown in Fig. 6. A third coil $L_3$ is arranged to rotate about a vertical axis within the combined field of the coils $L_1$ and $L_2$, so that the plane of $L_3$ may be made to coincide with either the plane of $L_1$ or $L_2$, as desired. The rotary movement of $L_3$ is controlled by means of a motor through a reduction gear connected to the shaft of the motor and the shaft of the coil $L_3$. The direction of rotation is controlled by the motor current reversing relay, which in turn is actuated by changes in the detector plate current of tube $D_3$.

The gain in the intermediate frequency amplifier circuits is controlled by the variable voltage drop along the resistance $R_1$ in the manner heretofore explained with respect to the previous forms of the invention. The signals at the intermediate frequency are received with variable phase and amplitude and it is the purpose of the circuit to combine the two signals, so as to make it possible to obtain a resultant at all times substantially constant in amplitude.

The theory of operation of the arrangements may be more readily understood from reference to the vector diagram of Fig. 7. The resultant magnetic field of the coils $L_1$ and $L_2$ is called a rotating field if the signals have any phase difference other than O or $\pi$. If, for instance, the signals are equal in amplitude and have a phase difference of $\frac{\pi}{2}$ the intensity of the field linking with the coil $L_3$ will remain constant for any angular position of the coil and it follows that the amplitude of the resultant signal induced in coil $L_3$ will not vary with the position of $L_3$. Let it be assumed that this situation gives the mean desired signal $H_m$. Let the ellipse represent the locus of the terminus of the field intensity vector for a particular condition, when the amplitudes and phases are changing corresponding to signal fading. If the coil $L_3$ is placed to link with a field of intensity $H_1$, the signal will still be maintained at the mean value as $H_1 = H_m$.

The coil $L_3$ is rotated to the desired position by the motor which is controlled in its action by the relay in the plate circuit of the detector $D_3$. The action of this relay reverses the polarity of the current in the motor armature circuit; this will reverse the direction of rotation of the motor. The relay also opens the motor armature circuit; this stops the rotation of the coil $L_3$. The current in the relay winding opposite to the winding in the detector plate circuit is adjusted by means of the resistance $R_2$ to a value which would hold the armature of the relay in mid-position so as not to make contact with the battery circuit, when the detector plate current has the value corresponding to that obtained from the mean signal.

The function of automatic gain control in the amplifiers goes on simultaneously with the automatic placing of the pick-up coil $L_3$ in the field $L_1$ and $L_2$; the gain will continue to change until the intensity of the field of the maximum signal equals the intensity of the field of the mean signal.

While the arrangements of the invention have been disclosed as embodied in certain specific arrangements which are deemed desirable, it is understood that it is capable of embodiment in many and other widely varied forms without departing from the spirit of the invention as defined by the appended claims.

What is claimed is:

1. The method of reducing fading of radio signals which comprises receiving said signals on separate antenna circuits, combining the outputs of said separate circuits on a common receiving circuit, detecting said signals on said common receiving circuit, utilizing the voltage variations in the output of the detector in said common receiving circuit to control the amplification therein, and utilizing the voltage variations in the output of the detector in said common receiving circuit for detuning said common receiving circuit to regulate the phases of said incoming signals.

2. A radio receiving system comprising two separate antenna circuits each including a transformer, a common receiving circuit connected to said antenna circuits by said transformers, an amplifier and a detector in said common receiver circuit, means to utilize the voltage variations in the output of said detector to control said amplifier, and means to utilize the voltage variations in the output of said detector to regulate the phase of the signals in said common receiving circuit.

3. A radio receiving system comprising two separate antenna circuits each including a transformer, a common receiving circuit connected to said antenna circuits by said transformers, an amplifier and detector in said common receiving circuit, means to apply the voltage variations in the output circuit of said detector to control the gain of said amplifier, and a circuit connected in parallel with the output circuit of said detector and including a winding on the core of one of said transformers, whereby the permeability of said core may be varied to regulate the phase of the signals in said common receiving circuit.

4. The method of receiving radio signals which comprises separately receiving said signals, combining said received signals, detecting said combined signals, and utilizing the voltage variations of said combined detected signals to produce a signal output of constant amplitude by causing said voltage variations to simultaneously and jointly regulate amplification and phase of the received signals.

5. A radio receiving system comprising two separate antenna circuits, a common receiving circuit connected to said antenna circuits, an amplifier and a detector in said common receiver circuit, means to utilize the voltage variations in the output of said detector to control said amplifier, and means to utilize the voltage variations in the output of said detector to regulate the phase of the signals in said common receiving circuit.

6. The method of reducing fading of radio signals which comprises separately receiving said signals, combining said received signals, detecting said combined signals, and utilizing the voltage variations of said combined detected signals to simultaneously control the amplification and to regulate the phase of the incoming signals.

7. The method of reducing fading of radio signals which comprises separately receiving said signals, separately amplifying said signals, combining said received signals, detecting said combined signals, and utilizing the voltage variations of said combined detected signals to simultaneously control the amplification and to regulate the phase of the incoming signals.

8. The method of receiving radio signals which comprises separately receiving said signals, combining said received signals, detecting said combined signals, and utilizing the voltage variations of said combined detected signals to regulate the phase of the received signals.

9. The method of receiving radio signals which comprises separately receiving said signals, combining said received signals, and utilizing the voltage variations of said combined signals to regulate the phase of the received signals.

10. The method of receiving radio signals which comprises separately receiving said signals, combining said received signals, and utilizing the voltage variations of said combined signals to control the amplification and to regulate the phase of the received signals.

11. The method of receiving radio signals which comprises separately receiving said signals and utilizing the combined effect of said received signals to control the phase of one of said received signals whereby constant signal output is produced.

12. A radio receiving system comprising two separate antenna circuits, amplifying means and phase shifting means in each of said antenna circuits, a common receiving circuit connected to said antenna circuits, a detector in said common receiving circuit, means to apply voltage variations in the output of said detector to control the amplifying means in said separate antenna circuits, and means for simultaneously applying said voltage variations in the output of said detector to control said phase shifting means.

13. A radio receiving system comprising two separate antenna circuits, amplifying means and phase shifting means in each of said antenna circuits, a common receiving circuit connected to said antenna circuits, a detector in said common receiving circuit, means to apply voltage variations in the output of said detector to control the amplifying means in said separate antenna circuits, and means associated with each of the phase shifting means in said separate antenna circuits to cause them to oppositely shift the phase of the signals coming in over said separate circuits.

In testimony whereof, I have signed my name to this specification this 23rd day of February, 1927.

DE LOSS K. MARTIN.